(12) United States Patent
Oh et al.

(10) Patent No.: US 7,626,417 B2
(45) Date of Patent: Dec. 1, 2009

(54) ON-DIE-TERMINATION CONTROL CIRCUIT AND METHOD

(75) Inventors: Seung-Min Oh, Kyoungki-do (KR); Ho-Youb Cho, Kyoungki-do (KR)

(73) Assignee: Hynix Semiconductor Inc., Kyoungki-Do (KR)

( * ) Notice: Subject to any disclaimer, the term of this patent is extended or adjusted under 35 U.S.C. 154(b) by 0 days.

(21) Appl. No.: 12/157,298

(22) Filed: Jun. 9, 2008

(65) Prior Publication Data

US 2009/0153186 A1 Jun. 18, 2009

(30) Foreign Application Priority Data

Dec. 12, 2007 (KR) ...................... 10-2007-0128682

(51) Int. Cl.
*H03K 17/16* (2006.01)
*H03K 19/003* (2006.01)

(52) U.S. Cl. .............................. 326/30; 326/32; 326/33
(58) Field of Classification Search .................... 326/30
See application file for complete search history.

(56) References Cited

U.S. PATENT DOCUMENTS

2004/0240298 A1\* 12/2004 Jin ............................. 365/222
2008/0204071 A1\* 8/2008 Lee et al. ..................... 326/30

\* cited by examiner

*Primary Examiner*—Anh Q Tran
(74) *Attorney, Agent, or Firm*—Blakely, Sokoloff, Taylor & Zafman LLP

(57) ABSTRACT

On-die-termination control circuit includes a clock generator configured to generate shift clocks in response to an on/off control signal; and a shift register configured to delay the on/off control signal in synchronization with the shift clocks to control on/off timing of an ODT operation.

14 Claims, 8 Drawing Sheets

ON-DIE-TERMINATION CONTROL CIRCUIT AND METHOD

CROSS-REFERENCE TO RELATED APPLICATIONS

The present invention claims priority of Korean patent application number 10-2007-0128682, filed on Dec. 12, 2007, which is incorporated by reference in its entirety.

BACKGROUND OF THE INVENTION

The present invention relates to an integrated circuit, and more particularly, to an integrated circuit configured to control on/off timing of an on-die-termination (ODT) operation for impedance control in a semiconductor device to prevent malfunctions of the semiconductor device.

Semiconductor devices are implemented into integrated circuit (IC) chips such as central processing units (CPUs), memories, and gate arrays, and are incorporated into a variety of electrical products such as personal computers, servers and workstations. Most semiconductor devices include a receiving circuit configured to receive external signals from an outside world through input pads and an output circuit configured to provide internal signals to an outside world through output pads.

As the operating speed of electrical products is increasing, a swing width of a signal exchanged between semiconductor devices is being gradually reduced for minimizing a delay time taken for signal transmission. However, the reduction in the swing width of the signal increases an influence of an external noise on the signal and causes the signal reflectance to become more critical at an interface terminal due to impedance mismatch. Such impedance mismatch is generally caused by an external noise, a variation of a power supply voltage, a change in an operating temperature, a change in a manufacturing process, etc. The impedance mismatch may lead to a difficulty in high-speed transmission of data and distortion in output data. Therefore, if semiconductor devices receive the distorted output signal through an input terminal, it frequently gives rise to problems such as a setup/hold failure and an error in decision of an input level.

In order to resolve the above problems, a memory device requiring high-speed performance employs an impedance matching circuit, which is called an ODT circuit, near an input pad inside an IC chip.

FIG. 1 is a block diagram of a typical ODT circuit and a typical ODT control circuit provided to a DDR2 semiconductor memory device.

The ODT control circuit includes an ODT buffer 110, a setup/hold delay 120, a clock generator 130, a shift register 140, and a controller 150 to control the ODT circuit 160.

The ODT buffer 110 buffers an on/off control signal ODT received from an external controller to enable/disable ODT operations.

The setup/hold delay 120 delays the buffered on/off control signal ODTI by a predetermined delay time to secure a setup/hold margin.

The clock generator 130 receives output clocks RCLKDLL and FCLKDLL of the delay locked loop (DLL) to generate shift clocks RCLKDLL0, FCLKDLL1, RCLKDLL2 and FCLKDLL3 having different phases, in a non-power-down mode (i.e., when a clock enable signal CKE has a logic low level).

The shift register 140 delays the delayed on/off control signal ODT_SH received from the setup/hold delay 120 in synchronization with the shift clocks RCLKDLL0, FCLKDLL1, RCLKDLL2 and FCLKDLL3. Logic levels of the shift clocks RCLKDLL0, FCLKDLL1, RCLKDLL2 and FCLKDLL3 are fixed to a logic high level in a power-down mode, whereas they are toggled in the non-power-down mode. Accordingly, the shift register 140 delays the delayed on/off control signal ODT_SH only in a non-power mode.

The shift register 140 also receives resistance information signals ODT0, ODT1 and ODT2 from an extended mode register set (EMRS) to determine termination resistance of the ODT circuit 160 according to which signals among the resistance information signals ODT0, ODT1 and ODT2 are activated. For example, the termination resistance of the ODT circuit 160 is 150Ω when the resistance information signal ODT0 is activated, 75Ω when the resistance information signals ODT0 and ODT1 are activated, and 50Ω when all the resistance information signals ODT0, ODT1 and ODT2 are activated. The shift register 140 delays the delayed on/off control signal ODT_SH in synchronization with the shift clocks RCLKDLL0, FCLKDLL1, RCLKDLL2 and FCLKDLL3, and outputs signals selected among combined on/off control signals ODTOUT0, ODTOUT1 and ODTOUT2 according to the activated signals among the resistance information signals ODT0, ODT1 and ODT2. Here, output timing of the combined on/off control signals ODTOUT0, ODTOUT1 and ODTOUT2 depends on the timing of the delayed on/off control signal ODT_SH. Which signal among the combined on/off control signals ODTOUT0, ODTOUT1 and ODTOUT2 is activated depends on which signal among the resistance information signals ODT0, ODT1 and ODT2 is input.

The controller 150 decodes the combined on/off control signals ODTOUT0, ODTOUT1 and ODTOUT2 received from the shift register 140 to activate at least one of ODT control signals SW0_UP, SW1_UP, SW2_UP, SW0_DN, SW1_DN and SW2_DN, thereby turning on/off resistors in the ODT circuit 160.

The enable circuit 170 shown at the left side of FIG. 1 receives the resistance information signals ODT0, ODT1 and ODT2. If at least one signal among the resistance information signals ODT0, ODT1 and ODT2 is activated, the enable circuit 170 activates an enable signal ODTENB to enable the ODT buffer 110, the clock generator 130 and the shift register 140.

In summary, timing for turning on/off the ODT circuit 160 is determined by a delay time of the on/off control signal ODT. The delay time is determined by transferring the on/off control signal ODT from an external controller or chipset to the shift resistor 140 via the ODT buffer 110 and the setup/hold delay 120. In addition, the resistance of the ODT circuit 160 is determined by the resistance information signals ODT0, ODT1 and ODT2 activated by the EMRS. More detailed description of the operation of the ODT control circuit will be described later with reference to FIG. 5.

FIG. 2 is a circuit diagram of the ODT circuit 160 of FIG. 1.

Referring to FIG. 2, the ODT circuit 160 includes a plurality of resistors 161 to 166 for terminating an input/output node DQ in a pull-up direction or in a pull-down direction. The resistors 161 to 166 are turned on/off in response to ODT control signals SW0_UP, SW0_DN, SW1_UP, SW1_DN, SW2_UP and SW2_DN received from the controller 150.

For example, when the termination resistance is set to 150, the resistors 161 and 162 are turned on in response to the ODT control signals SW0_UP and SW0_DN to terminate the input/output node DQ with a resistance of 150. Similarly, when the termination resistance is set to 75, the resistors 161, 162, 163 and 164 are turned on, and when the termination resistance is set to 50, all the resistors 161, 162, 163, 164, 165 and 166 are turned on.

FIG. 3 is a circuit diagram of a shift register 140 shown in FIG. 1.

Referring to FIG. 3, the shift register 140 includes pass gates PG1, PG2, PG3, PG4 and PG5 which are turned on/off in response to an internal clock CK0 and shift clocks RCLKDLL0, FCLKDLL1, RCLKDLL2, FCLKDLL3. Here, the shift clocks RCLKDLL0, FCLKDLL1, RCLKDLL2, FCLKDLL3 with different phases are generated by the output clocks FCLKDLL and RCLKDLL of the DLL.

In a non-power-down mode (i.e., when the clock enable signal CKE has a logic high level), if at least one of the resistance information signals ODT0, ODT1 and ODT2 are activated, the enable signal ODTENB is activated to a logic low level. Then, the shift register 140 becomes able to receive the delayed on/off control signal ODT_SH. While the internal clock CK0 is at a logic high level, the delayed on/off control signal ODT_SH is transferred to a node ND. Thereafter, the delayed on/off control signal ODT_SH is transferred further sequentially in response to the shift clocks RCLKDLL0, FCLKDLL1, RCLKDLL2, FCLKDLL3. Then, a NAND operation is performed on a first internal delayed on/off control signal ODTOND before the pass gate PG5 and a second internal delayed on/off control signal ODTOFFD after the pass gate PG5 to activate a shifted on/off control signal ODTS.

Then, NAND operations are performed on the shifted on/off control signal ODTS and the resistance information signals ODT0, ODT1 and ODT2 received from the EMRS to activate combined on/off control signals ODTOUT0, ODTOUT1 and ODTOUT2, respectively. Accordingly, the combined on/off control signals ODTOUT0, ODTOUT1 and ODTOUT2 have information about resistances according to the resistance information signals ODT0, ODT1 and ODT2, respectively, as well as information about on/off timing of an ODT operation according to the delayed on/off control signal ODTS.

In a power-down mode (i.e., when the clock enable signal CKE has a logic low level), logic levels of the shift clocks RCLKDLL0, FCLKDLL1, RCLKDLL2 and FCLKDLL3 are all fixed to a logic high level to reduce lo current consumption. Accordingly, the pass gates PG2, PG3, PG4 and PG5 are all turned on, and thus the delayed on/off control signal ODT_SH passes through the shift register 140 without being shifted in response to the shift clocks RCLKDLL0, FCLKDLL1, RCLKDLL2 and FCLKDLL3.

FIG. 4 is a circuit diagram of a clock generator 130 shown in FIG. 1.

In a non-power-down mode, the clock generator 130 receives a rising clock RCLKDLL and a falling clock FCLKDLL from the DLL to reduce pulse widths thereof and then shift phases thereof, thereby outputting the shift clocks RCLKDLL0, FCLKDLL1, RCLKDLL2 and FCLKDLL3. In a power-down mode, the clock generator 130 fixes logic levels of the rising and falling clocks RCLKDLL and FCLKDLL to a logic high level. Therefore, the shift clocks RCLKDLL0, FCLKDLL1, RCLKDLL2 and FCLKDLL3 are not generated.

Upper portion of FIG. 4 illustrates a portion of the clock generator 130 for receiving the rising clock RCLKDLL to generate the shift clocks RCLKDLL0 and RCLKDLL2, and a lower portion of FIG. 4 illustrates a portion of the clock generator 130 for receiving the falling clock FCLKDLL to generate shift clocks FCLKDLL1 and FCLKDLL3. Except that input signals and output signals thereof are different from each other, operations of the two portions are identical to each other. Therefore, only the portion of the clock generator 130 for receiving the rising clock RCLKDLL to generate the shift clocks RCLKDLL0 and RCLKDLL2 will be described below.

When the termination resistance is determined (i.e., at least one of the resistance information signals ODT0, ODT1 and ODT2 in FIG. 1 is activated), the inverter 401 is enabled. Passing through the inverters 401, 402 and 403, the rising clock RCLKDLL is delayed by a predetermined delay time. While the rising clock RCLKDLL passes through the inverter 401, a delay time of a falling edge thereof is longer than that of a rising edge thereof because the inverter 401 has resistance only in a pull-up direction. On the contrary, while the rising clock RCLKDLL passes through the inverter 402, a delay time of the rising edge thereof is longer than that of the falling edge thereof because the inverter 402 has resistance only in a pull-down direction. A NAND gate 404 performs a NAND operation on the rising clock RCLKDLL output from the inverter 403 and the original rising clock RCLKDLL to reduce pulse width of the rising clock RCLKDLL.

In a non-power-down mode, because the clock enable signal CKE has a logic high level, the NAND gate 408 reduces pulse width of the rising clock RCLKDLL. The delay lines 409 and 410 shift phase of the rising clock RCLKDLL output from the NAND gate 408 to output shift clocks RCLKDLL0 and RCLKDLL2.

FIG. 5 is a timing diagram illustrating operations of the typical ODT control circuit (shown in FIGS. 1 and 3) in the non-power-down mode and the power-down mode.

To begin with, the non-power-down mode where the clock enable signal CKE has a logic high level will be described. For convenience of explanation, the case where only the resistance information signal ODT0 among the resistance information signals ODT0, ODT1 and ODT2 is activated, i.e., the case where the termination resistance is set to 150Ω by EMRS will be described.

If the resistance information signal ODT0 is activated, the enable signal ODTENB is activated to a logic low level by the enable circuit 170. Then, the ODT buffer 110 and the shift register 140 are enabled. The on/off control signal ODT_SH is input from the external controller and then pass through the ODT buffer 110 and the setup/hold delay 120 to be output to the shift register 140 as a delayed on/off control signal ODT_SH. In the shift register 140, the delayed on/off control signal ODT_SH passes through the pass gate PG1 in response to the internal clock CLK0, and then sequentially transferred to the node NC and to the node ND. Thereafter, the delayed on/off control signal ODT_SH sequentially transferred further to the node NF, to the node NH and then to the node NI, in response to the RCLKDLL0, FCLKDLL1 and RCLKDLL2, respectively. The first internal delayed on/off control signal ODTOND before the pass gate PG5 which is turned on/off in response to the shift signal FCLKDLL3 and the second internal delayed on/off control signal ODTOFFD after the pass gate PG5 pass through respective delays. A NAND operation is performed on the first internal delayed on/off control signal ODTOND and the second internal delayed on/off control ODTOFD to activate a shifted on/off control signal ODTS.

Then, a NAND operation is performed on the shifted on/off control signal ODTS and the resistance information signal ODT0 activated by the EMRS to activate the combined on/off control signal ODTOUT0. Accordingly, the combined on/off control signal ODTOUT0 has information about resistance according to the resistance information signals ODT0, ODT1 and ODT2 as well as information about on/off timing of the ODT operation according to the shifted on/off control signal ODTS.

In the power-down mode where the clock enable signal CKE has a logic low level, the shift clocks RCLKDLL0, FCLKDLL1, RCLKDLL2 and FCLKDLL3 are all fixed to a logic high level to reduce current consumption. Accordingly, the delayed on/off control signal ODT_SH passes through the shift register 140 without being delayed in synchronization with the shift clocks RCLKDLL0, FCLKDLL1, RCLKDLL2 and FCLKDLL3. Therefore, the combined on/off control signal ODTOUT0 is activated and deactivated without being delayed sufficiently.

As described above, since delay of the delayed on/off control signal in response to the shift clocks RCLKDLL0, FCLKDLL1, RCLKDLL2 and FCLKDLL3 does not take place in the power-down mode, on/off timing of the ODT operation in the power-down mode is advanced more than in the non-power-down mode. Therefore, during the operation of a memory device in one slot (for example, in a PC, a DRAM installed in one memory slot among a plurality of memory slots), ODT operation of a memory device in a power-down mode in another slot may be performed amiss, causing a failure.

SUMMARY OF THE INVENTION

Embodiments of the present invention are directed to providing an on-die-termination (ODT) control circuit and an ODT control method for preventing failure caused by premature on/off timing of an ODT operation in a power-down mode.

The ODT control circuit generates shift clocks during an ODT operation in a power-down mode as well as in a non-power-down mode, so that the on/off control signal may be shifted by a shift register even in the power-down mode.

In accordance with an aspect of the present invention, there is provided a clock generator configured to generate shift clocks in response to an on/off control signal and a shift register configured to delay the on/off control signal in synchronization with the shift clocks to control on/off timing of an ODT operation. In accordance with another aspect of the present invention, there is provided a an on-die-termination buffer configured to buffer an on/off control signal received from an external controller, a clock generator configured to generate shift clocks in response to the on/off control signal received from the on-die-termination buffer, a setup/hold delay configured to delay the on/off control signal received from the on-die-termination buffer, by a predetermined delay time, a shift register configured to delay the on/off control signal received from the setup/hold delay, in synchronization with the shift clocks and a controller configured to control an on-die-termination operation according to information about on/off timing of the on-die-termination operation and information about termination resistance which are included in the on/off control signal received from the shift register. In accordance with another aspect of the present invention, there is provided an on-die-termination control method that includes a step of receiving an on/off control signal from an external controller, a step of generating shift clocks in response to the on/off control signal and a step of delaying the on/off control signal in synchronization with the shift clocks to control on/off timing of an on-die-termination operation.

The shift register may receive the on/off control signal a predetermined time after the clock generator receives the on/off control signal.

As a result, since the on/off control signal can be delayed by the shift clocks even in a power-down mode, the on/off operation of the ODT operation can be controlled stably. In addition, since the shift clocks are generated only when the on/off control signal is activated (i.e., only when the ODT operation is performed), additional current consumption can be minimized.

The delaying of the on/off control signal may include: delaying the on/off control signal by a predetermined delay time to output a delayed on/off control signal; and delaying the delayed on/off control signal in synchronization with the shift clocks to control on/off timing of an ODT operation.

DESCRIPTION OF SPECIFIC EMBODIMENTS

Hereinafter, an on-die-termination (ODT) control circuit and an ODT control method in accordance with the present invention will be described in detail with reference to the accompanying drawings.

Figure 6:
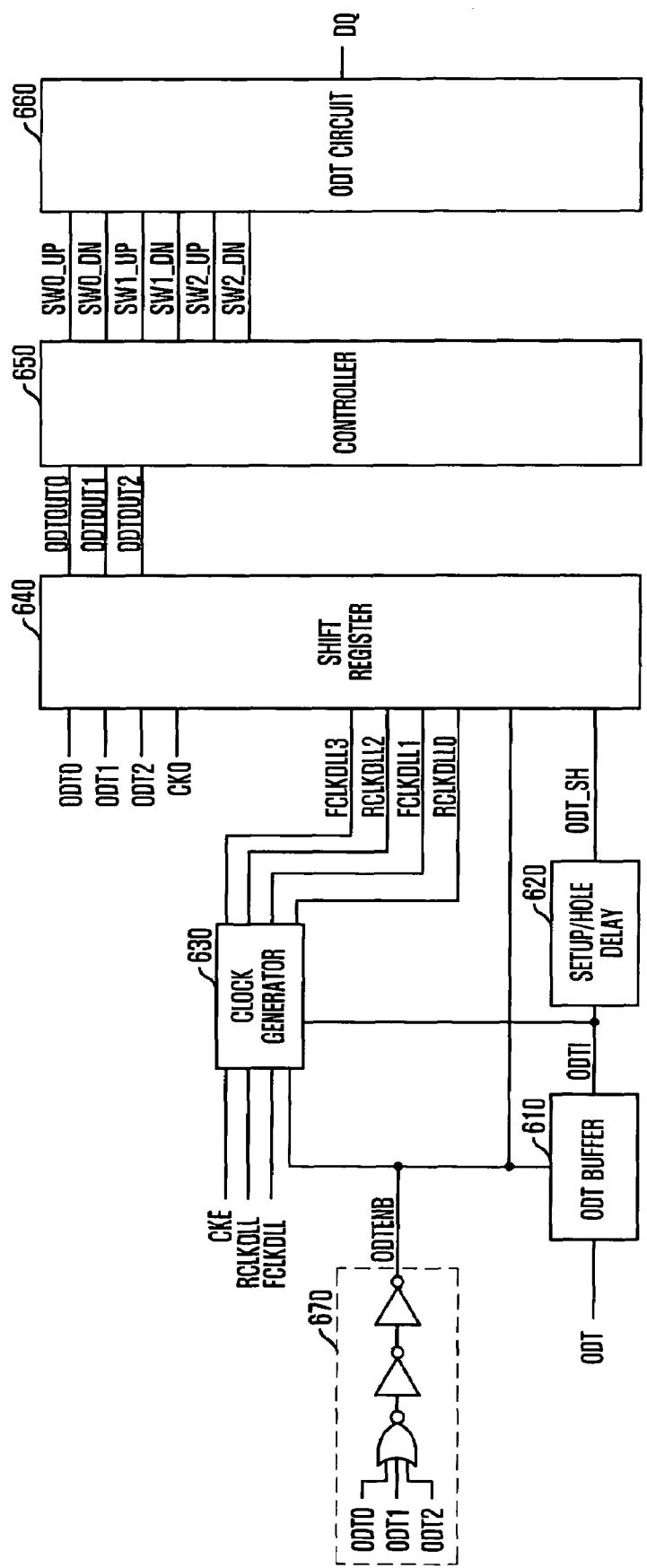
FIG. 6 is a block diagram of an ODT circuit and an ODT control circuit in accordance with an embodiment of the present invention.

FIG. 6 is a block diagram of an ODT circuit and an ODT control circuit in accordance with an embodiment of the present invention.

The ODT control circuit includes an ODT buffer 610, a clock generator 630, a setup/hold delay 620, a shift register 640, and a controller 650. The ODT buffer 610 buffers an on/off control signal ODT received from an external controller or an external chipset. The clock generator 630 is enabled by the buffered on/off control signal ODTI received from the ODT buffer 610 to generate shift clocks RCLKDLL0, FCLKDLL1, RCLKDLL2 and FCLKDLL3. The setup/hold delay 620 delays the buffered on/off control signal ODTI by a predetermined delay time. The shift register 640 delays the delayed on/off control signal ODT_SH received from the setup/hold delay 620 in synchronization with the sift clocks RCLKDLL0, FCLKDLL1, RCLKDLL2 and FCLKDLL3. The controller 650 controls the ODT operation according to information about the on/off timing of the ODT operation and information about a termination resistance which are included in combined on/off control signals ODTOUT0, ODTOUT1 and ODTOUT2 received from the shift register 640.

Figure 1:
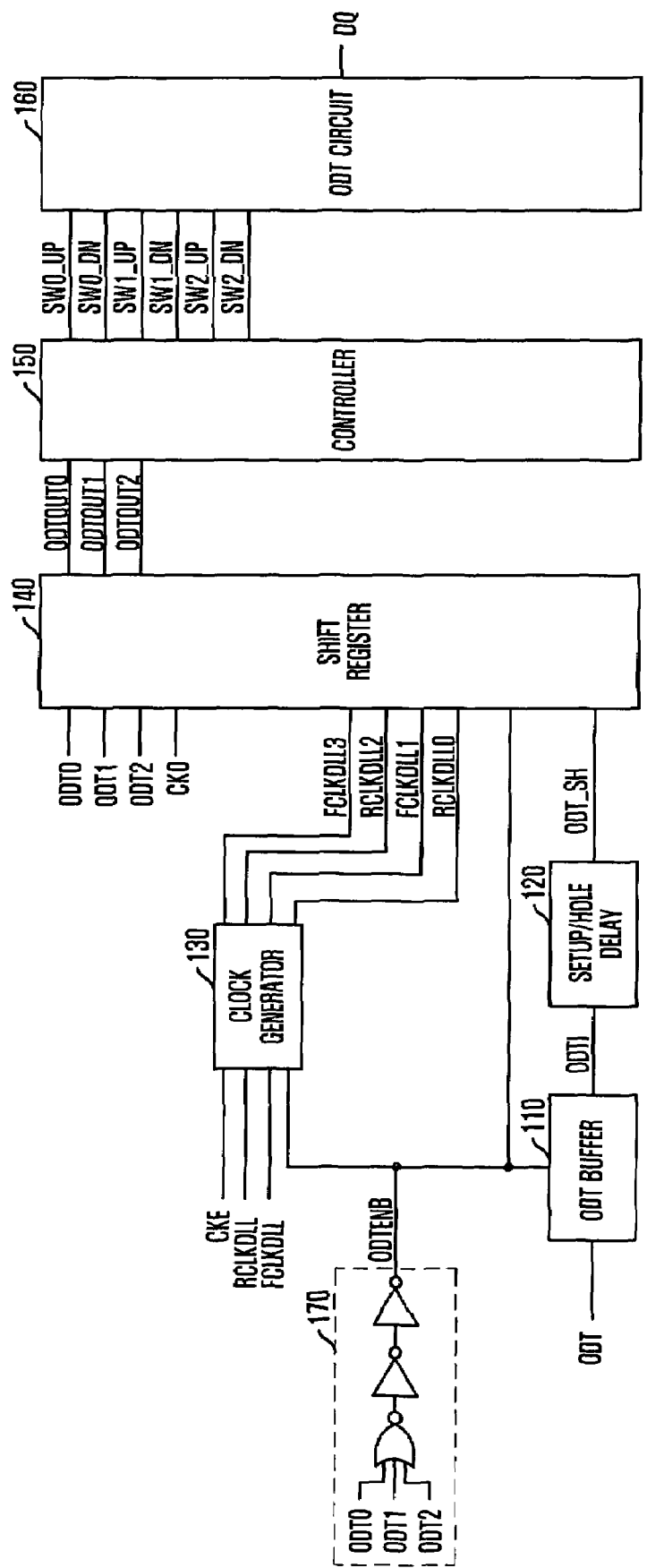
FIG. 1 is a block diagram of a typical on-die-termination (ODT) circuit and a typical ODT control circuit.
Figure 2:
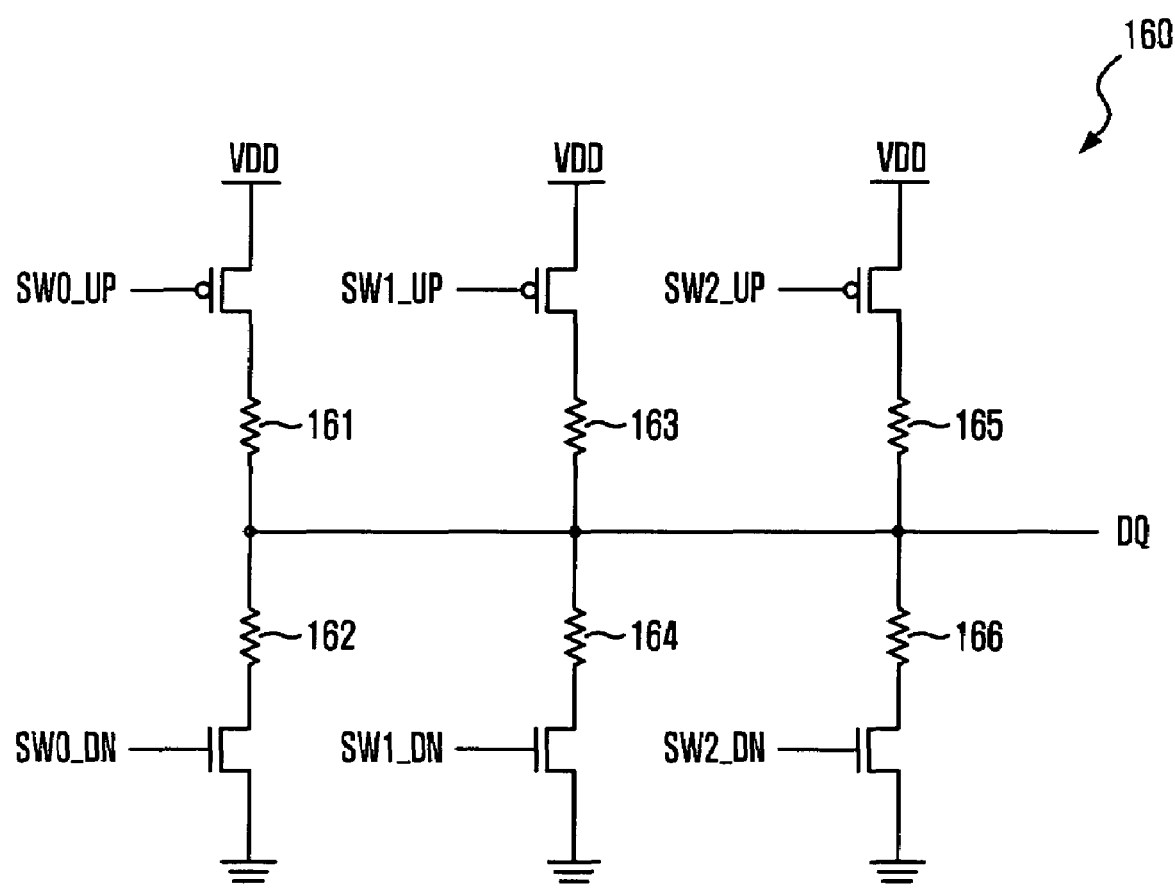
FIG. 2 is a circuit diagram of the ODT circuit of FIG. 1.
Figure 3:
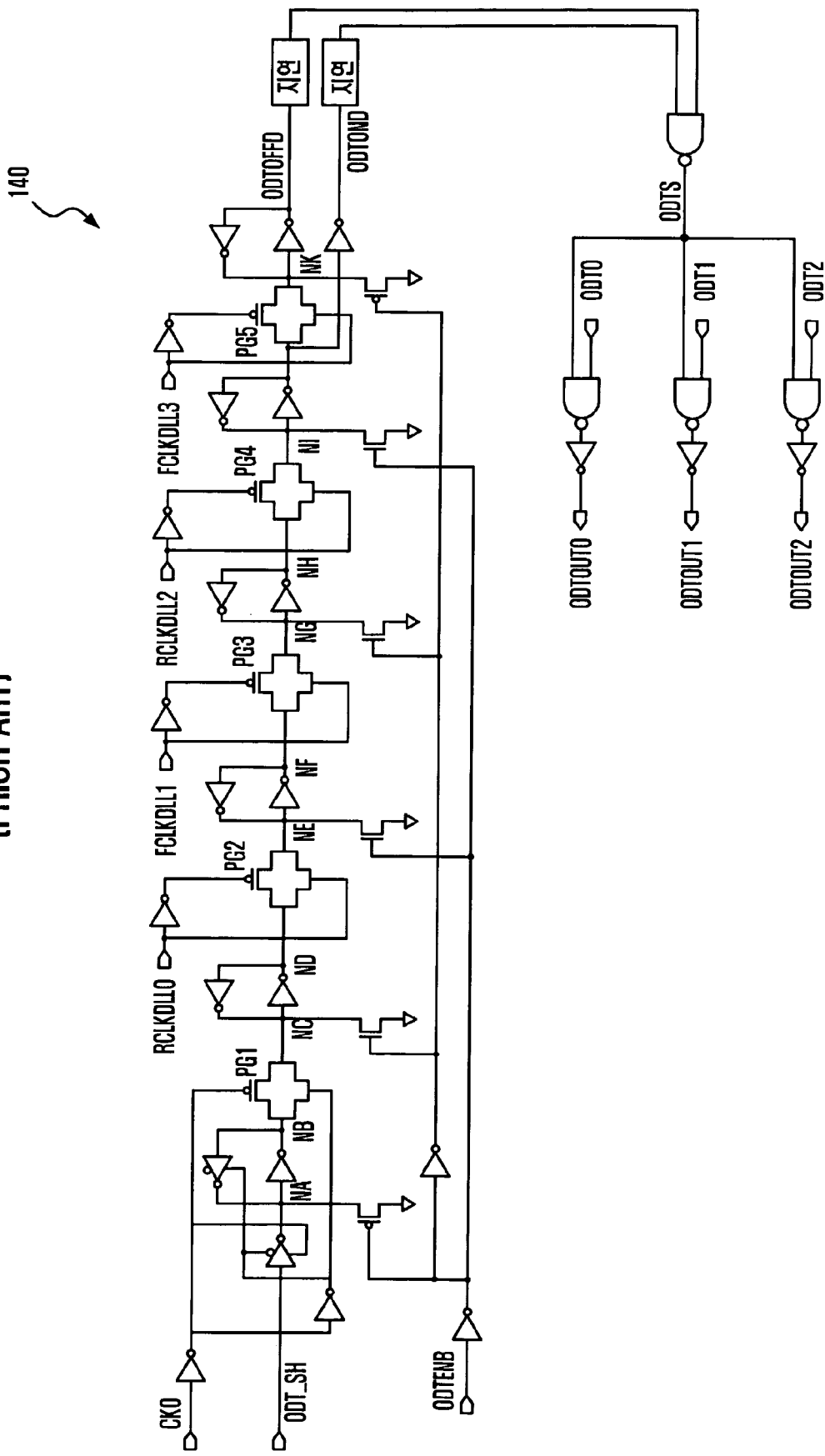
FIG. 3 is a circuit diagram of a shift register shown in FIG. 1.

The ODT control circuit in accordance with the embodiment is different from the typical ODT control circuit in that the clock generator 630 is enabled by the buffered on/off control signal ODTI to generate shift clocks RCLKDLL0, FCLKDLL1, RCLKDLL2 and FCLKDLL3. The typical clock generator 130 (FIG. 1) generates shift clocks RCLKDLL0, FCLKDLL1, RCLKDLL2 and FCLKDLL3 only in a non-power-down mode while fixing the shift clocks RCLKDLL0, FCLKDLL1, RCLKDLL2 and FCLKDLL3 to a logic high level in a power-down mode. On the contrary, the ODT control circuit in accordance with the embodiment generates the shift clocks RCLKDLL0, FCLKDLL1, RCLKDLL2 and FCLKDLL3 or fixes the shift clocks RCLKDLL0, FCLKDLL1, RCLKDLL2 and FCLKDLL3 to a logic high level depending on whether the buffered on/off control signal ODTI is activated or not, i.e., whether the ODT operation is performed or not. In other words, whether in the power-down mode or in the non-power-down mode, the shift register 640 delays the delayed on/off control signal ODT_SH in response to the shift clocks RCLKDLL0, FCLKDLL1, RCLKDLL2 and FCLKDLL3 whenever the ODT operation is being performed. Therefore, premature on/off timing of the termination operation can be prevented in the power-down mode.

Operations of the ODT buffer 610, the setup/hold delay 620, the shift register 630 and the controller 640 other than the clock generator 630 are the same as those of the typical ODT control circuit. Therefore descriptions thereof will be omitted.

The clock generator 630 receives the buffered on/off control signal ODTI from the ODT buffer 610, and the shift register 640 receives the delayed on/off control signal ODT_SH from the setup/hold delay 620. In other words, the inputting of the delayed on/off control signal ODT_SH to the shift register 640 is delayed more than the inputting of the buffered on/off control signal ODTI to the clock generator 630.

This is because the shift register 640 delays the delayed on/off control signal ODT_SH in synchronization with the shift clocks RCLKDLL0, FCLKDLL1, RCLKDLL2 and FCLKDLL3 generated by the clock generator 630, and thus enabling the clock generator 630 before the enabling of the shift register 640 is advantageous on margin of a signal.

Referring to FIG. 6, a clock enable signal CKE is input to the clock generator 630. Note that this is an optional configuration and will be described later with reference to FIG. 6.

Figure 7:
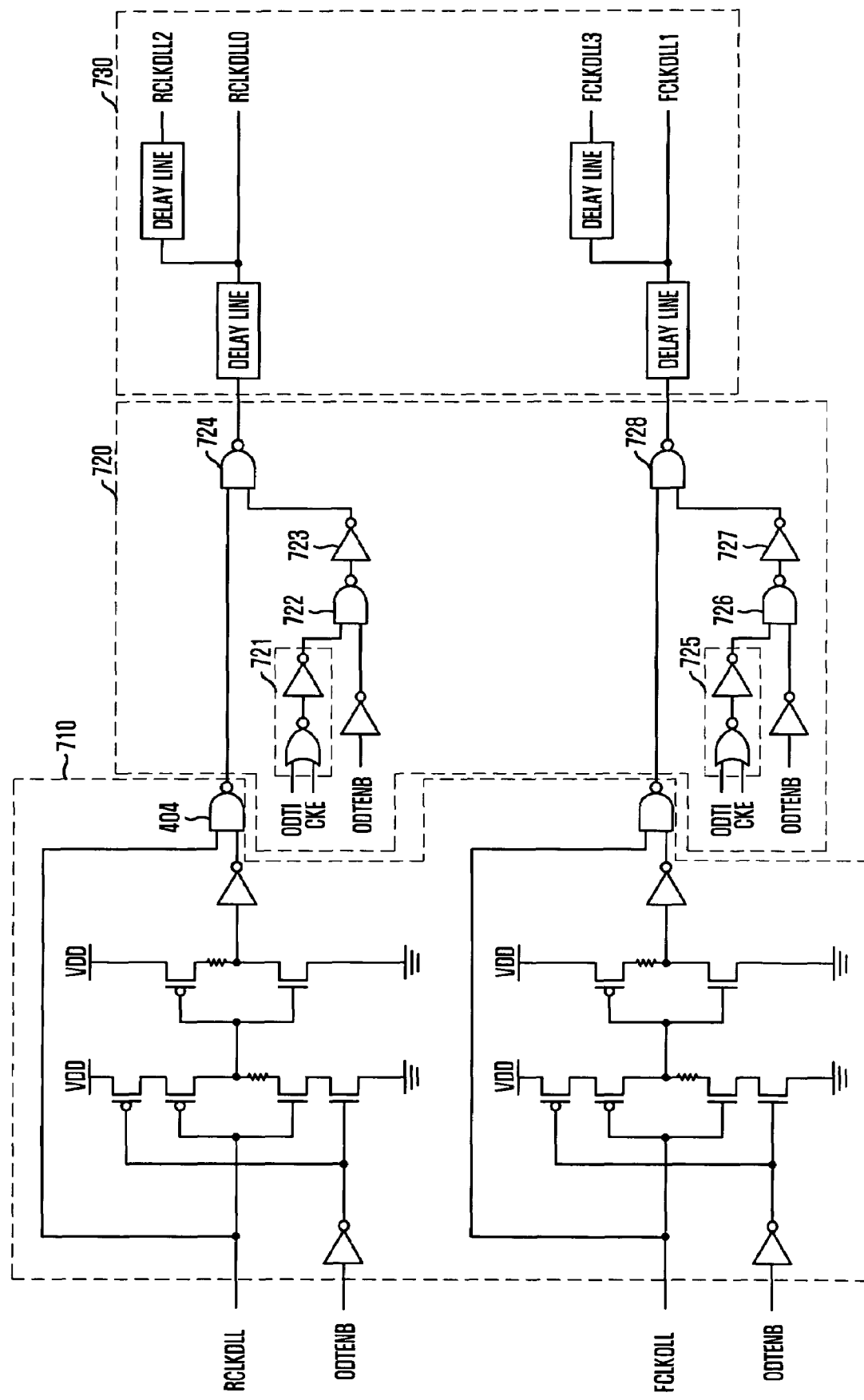
FIG. 7 is a circuit diagram of a clock generator shown in FIG. 6.

FIG. 7 is a circuit diagram of a clock generator 630 shown in FIG. 6.

Referring to FIG. 7, the clock generator 630 includes a pulse width control unit 710, an activation unit 720, and a phase shift unit 730. The pulse width control unit 710 reduces pulse widths of a rising clock RCLKDLL and a falling clock FCLKDLL received from a DLL (not shown). The activation unit 720 receives the rising and falling clocks RCLKDLL and FCLKDLL from the pulse width control unit 710 to output them in response to the delayed on/off control signal ODTI. The phase shift unit 730 shifts phases of the rising and falling clocks RCLKDLL and FCLKDLL to generate shift clocks RCLKDLL0, FCLKDLL1, RCLKDLL2 and FCLKDLL3.

Figure 4:
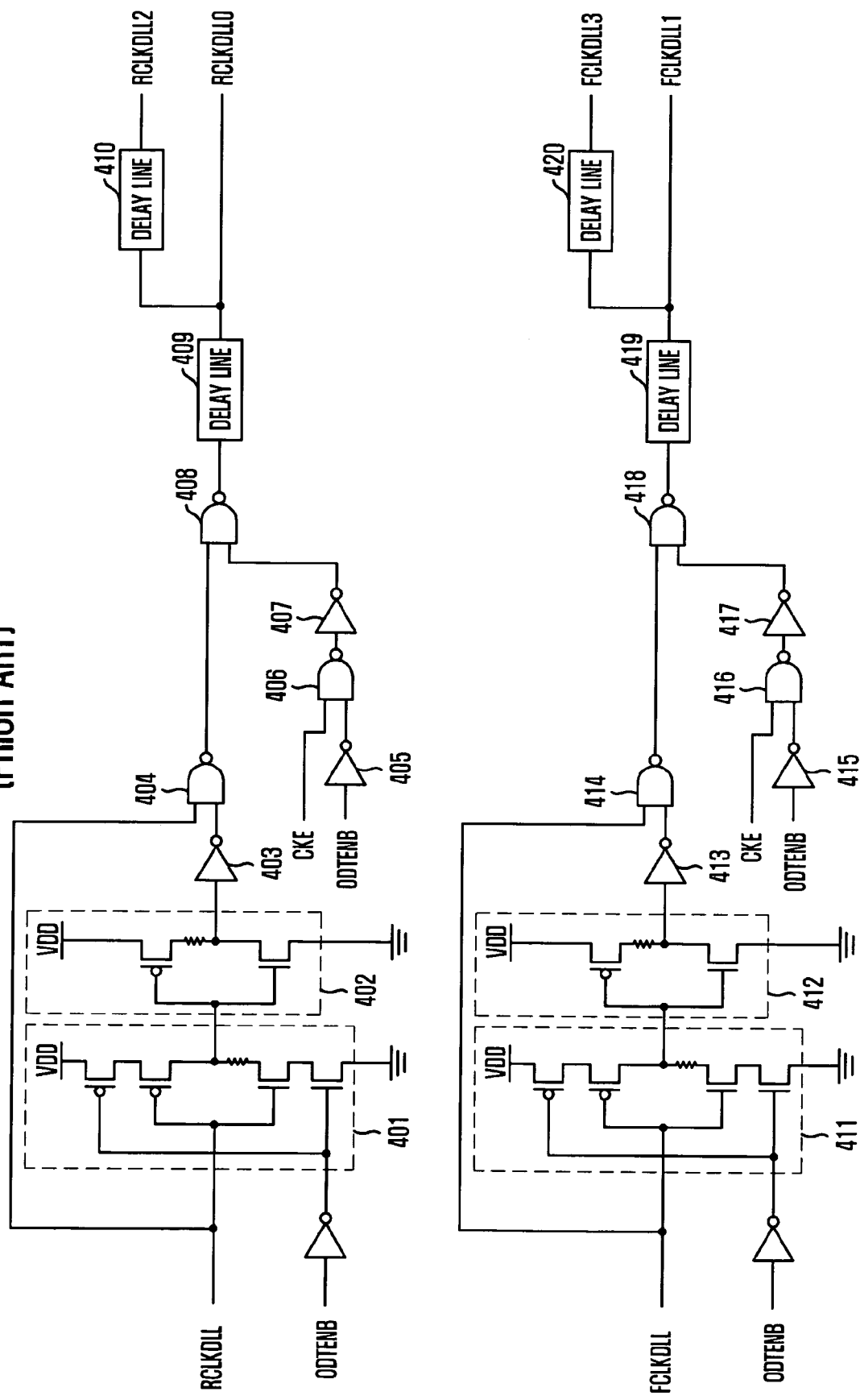
FIG. 4 is a circuit diagram of a clock generator shown in FIG. 1.

The pulse width control unit 710 reduces pulse widths of the rising and falling clocks RCLKDLL and FCLKDLL (more detailed description thereof has already been given above with reference to FIG. 4).

The activation unit 720 outputs the rising and falling clocks RCLKDLL and FCLKDLL to the phase shift unit 730 when the buffered on/off control signal ODTI is activated, and fixes their logic levels to a logic high level (i.e., stops generating the shift clocks) when the buffered on/off control signal ODTI is deactivated, basically.

Referring to FIG. 7, the OR gates 721 and 725 perform OR operations on the buffered on/off control signal ODTI and a clock enable signal CKE to output the resultant signals to NAND gates 722 and 726. This is designed for generating the shift clocks RCLKDLL0, FCLKDLL1, RCLKDLL2 and FCLKDLL3 regardless of the logic level of the buffered on/off control signal ODTI in the non-power-down mode (i.e., when the clock enable signal CKE has a logic low level). This is because the shift clocks RCLKDLL0, FCLKDLL1, RCLKDLL2 and FCLKDLL3 may also be used in other circuits as well as the ODT control circuit in the non-power-down mode.

As described above, the OR gates 721 and 725 for performing OR operation on the buffered on/off control signal ODTI and the clock enable signal CKE to output the resultant signal to the NAND gates 722 and 726 are optional elements. Accordingly, it is also possible that the buffered on/off control signal ODTI is directly input to the NAND gates 722 and 726 without passing through the OR gates 721 and 725.

The phase shift unit 730 delays the rising and falling clocks RCLKDLL and FCLKDLL, which are received from the activation unit 720 with a reduced pulse width, by various delay times to output shift clocks RCLKDLL0, FCLKDLL1, RCLKDLL2 and FCLKDLL3 of different phases.

In summary, the clock generator 630 generates shift clocks RCLKDLL0, FCLKDLL1, RCLKDLL2 and FCLKDLL3 when the buffered on/off control signal ODTI is activated, and fixes logic levels of the shift clocks RCLKDLL0, FCLKDLL1, RCLKDLL2 and FCLKDLL3 to a logic high level (i.e., does not generate the shift clocks RCLKDLL0, FCLKDLL1, RCLKDLL2 and FCLKDLL3) when the buffered on/off control signal ODTI is deactivated. In addition, when provided with the OR gates 721 and 725, the clock generator 630 generates the shift clocks RCLKDLL0, FCLKDLL1, RCLKDLL2 and FCLKDLL3 regardless of the logic level of the buffered on/off control signal ODTI in the non-power-down mode.

Figure 8:
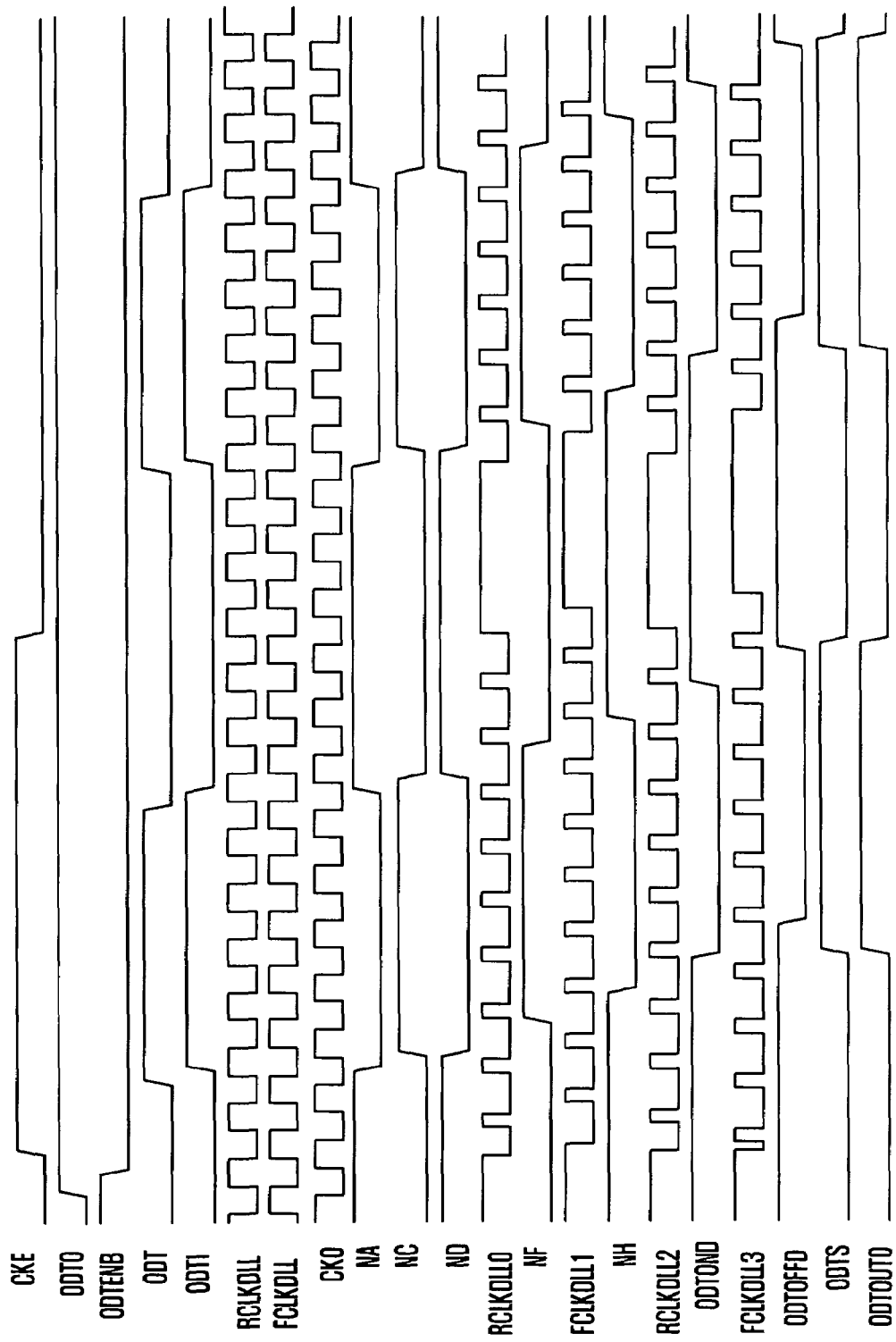
FIG. 8 is a timing diagram illustrating an operation of an ODT control circuit in accordance with an embodiment of the present invention.

FIG. 8 is a timing diagram illustrating an operation of an ODT control circuit in accordance with an embodiment of the present invention.

For convenience of explanation, the case where only the signal ODT0 among the signals ODT0, ODT1 and ODT2 is activated, i.e., the case where the termination resistance is set to 150Ω by EMRS will be described. In addition, in the following embodiment, the ODT control circuit is provided with the OR gates 721 and 725 of FIG. 7.

Figure 5:
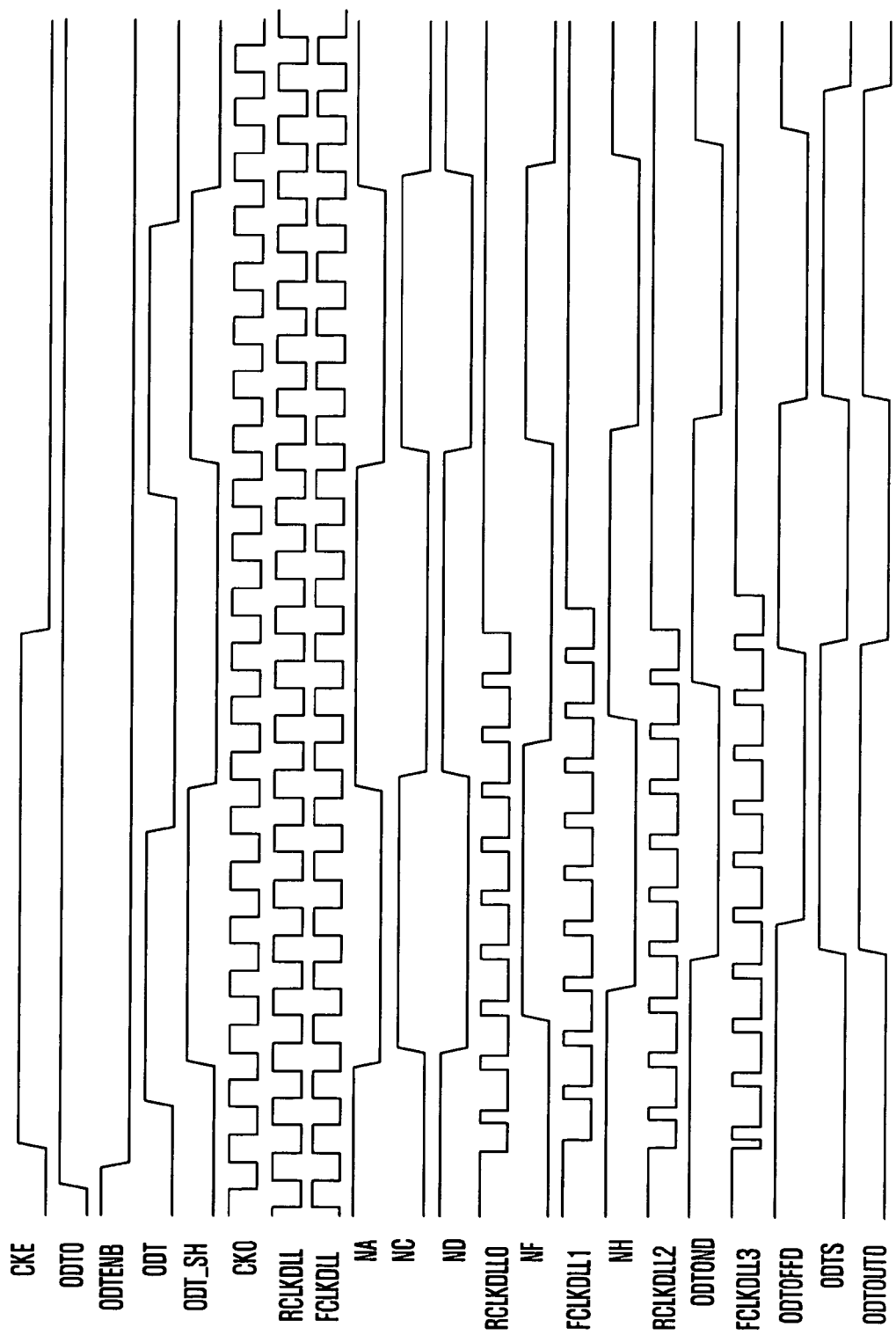
FIG. 5 is a timing diagram illustrating operations of the typical ODT control circuit shown in FIGS. 1 and 3, in a non-power-down mode and a power-down mode.

The operation of the ODT control circuit in a non-power-down mode when the clock enable signal CKE is deactivated is basically the same as that of the typical ODT control circuit described above with reference to FIG. 5. On the contrary, in a power-down mode when the clock enable signal CKE is deactivated, the clock generator 630 generates shift clocks RCLKDLL0, FCLKDLL1, RCLKDLL2 and FCLKDLL3 whenever the buffered on/off control signal ODTI is activated. As such, the shift register 640 can delay the buffered on/off control signal ODTI even in the power-down mode. Therefore, since the termination operation can be enabled/disabled even in the power-down mode with the same timing as that in the non-power-down mode, the failure caused by the premature on/off timing of the ODT operation in the power-down-mode can be prevented, which is different from the typical ODT control circuit.

The ODT control circuit in accordance with embodiments of the present invention may consume additional current because it generates the shift clocks RCLKDLL0, FCLKDLL1, RCLKDLL2 and FCLKDLL3 even in the power-down mode. However, the additional current consumption is not too high because the ODT control circuit generates the shift clocks RCLKDLL0, FCLKDLL1, RCLKDLL2 and FCLKDLL3 only while the buffered on/off control signal ODTI is activated (i.e., only while the termination operation is performed).

Hereinafter, an ODT control method in accordance with an embodiment of the present invention will be described with reference to FIG. 6.

The ODT control method includes: receiving an on/off control signal ODT from an external controller; buffering the on/off control signal ODT to generate a buffered on/off control signal ODTI; generating shift clocks RCLKDLL0, FCLKDLL1, RCLKDLL2 and FCLKDLL3 in response to the buffered on/off control signal ODTI; and delaying a delayed on/off control signal ODT_SH in synchronization with the shift clocks RCLKDLL0, FCLKDLL1, RCLKDLL2 and FCLKDLL3 to control on/off timing of an ODT operation.

The delayed on/off control signal ODT_SH may be either the same signal as the buffered on/off control signal ODTI or a delayed signal of the buffered on/off control signal ODTI. This is because generating the shift clocks RCLKDLL0, FCLKDLL1, RCLKDLL2 and FCLKDLL3 before controlling the on/off timing is advantageous on margin of a signal, considering that the shift register 640 delays the delayed on/off control signal ODT_SH by using the shift clocks RCLKDLL0, FCLKDLL1, RCLKDLL2 and FCLKDLL3 generated by the clock generator 630. For reference, here, the shift clocks RCLKDLL0, FCLKDLL1, RCLKDLL2 and FCLKDLL3 are generated by the clock generator 630, and the delayed on/off control signal ODT_SH is delayed further by the shift register 640.

In accordance with the present invention, the shift clocks are generated in response to the on/off control signal which is activated during the ODT operation, and the on/off control signal is delayed in synchronization with the shift clocks.

Accordingly, the shift clocks are generated and thus the on/off control signal are delayed in synchronization with the shift clocks, whenever the ODT operation is performed even in the power-down mode. As such, the on/off timing of the ODT operation can be stably controlled even in the power-down mode.

Furthermore, the shift clocks are generated only while the ODT operation is performed, i.e., only while the on/off control signal is activated. Therefore, power consumption required to generate the shift clocks can be minimized.

While the present invention has been described with respect to the specific embodiments, it will be apparent to those skilled in the art that various changes and modifications may be made without departing from the spirit and scope of the invention as defined in the following claims.

What is claimed is:

1. An on-die-termination control circuit, comprising:
    a clock generator configured to generate shift clocks in response to an on/off control signal; and
    a shift register configured to delay the on/off control signal in synchronization with the shift clocks to control on/off timing of an on-die-termination operation.

2. The on-die-termination control circuit as recited in claim 1, wherein the on/off control signal is generated by an external controller.

3. The on-die-termination control circuit as recited in claim 1, wherein the on/off control signal applied to the shift register is a delayed signal of the on/off control signal applied to the clock generator.

4. The on-die-termination control circuit as recited in claim 1, wherein the clock generator is enabled when a clock enable signal or the on/off control signal is activated.

5. The on-die-termination control circuit as recited in claim 1, wherein the clock generator receives an output clock of a delay locked loop to generate the shift clocks.

6. The on-die-termination control circuit as recited in claim 5, wherein the clock generator comprises:
    a pulse width control unit configured to receive the output clock of the delay locked loop including a rising clock and a falling clock to reduce pulse width of the rising and falling clocks;
    an activation unit configured to output the rising and falling clocks received from the pulse width control unit in response to the on/off control signal; and
    a phase shift unit configured to shift phase of the rising and falling clocks received from the activation unit to generate the shift clocks.

7. The on-die-termination control circuit as recited in claim 6, wherein the activation unit outputs the rising and falling clocks regardless of a logic level of the on/off control signal in a non-power-down mode.

8. An on-die-termination control circuit, comprising:
    an on-die-termination buffer configured to buffer an on/off control signal received from an external controller;
    a clock generator configured to generate shift clocks in response to the on/off control signal received from the on-die-termination buffer;
    a setup/hold delay configured to delay the on/off control signal received from the on-die-termination buffer, by a predetermined delay time;
    a shift register configured to delay the on/off control signal received from the setup/hold delay, in synchronization with the shift clocks; and
    a controller configured to control an on-die-termination operation according to information about on/off timing of the on-die-termination operation and information about termination resistance which are included in the on/off control signal received from the shift register.

9. The on-die-termination control circuit as recited in claim 8, wherein the clock generator is enabled when clocks activation signal or the on/off control signal is activated.

10. The on-die-termination control circuit as recited in claim 8, wherein the clock generator receives an output clock of a delay locked loop to generate the shift clock.

11. The on-die-termination control circuit as recited in claim 10, wherein the clock generator comprises:
    a pulse width control unit configured to receive the output clocks of the delay locked loop including a rising clock and a falling clock to reduce pulse width of the rising and falling clocks;
    an activation unit configured to output the rising and falling clocks received from the pulse width control unit in response to the on/off control signal; and
    a phase shift unit configured to shift phase of the rising and falling clocks received from the activation unit to generate the shift clocks.

12. The on-die-termination control circuit as recited in claim 11, wherein the activation unit outputs the rising and falling clocks regardless of a logic level of the on/off control signal in a non-power-down mode.

13. An on-die-termination control method, comprising:
    receiving an on/off control signal from an external controller;
    generating shift clocks in response to the on/off control signal; and
    delaying the on/off control signal in synchronization with the shift clocks to control on/off timing of an on-die-termination operation.

14. The on-die-termination control method as recited in claim 13, wherein the delaying of the on/off control signal comprises:

delaying the on/off control signal by a predetermined delay time to output a delayed on/off control signal; and delaying the delayed on/off control signal in synchronization with the shift clocks to control on/off timing of an on-die-termination operation.

* * * * *